Inventors
Nicholas W. Dockery
John C. Dockery

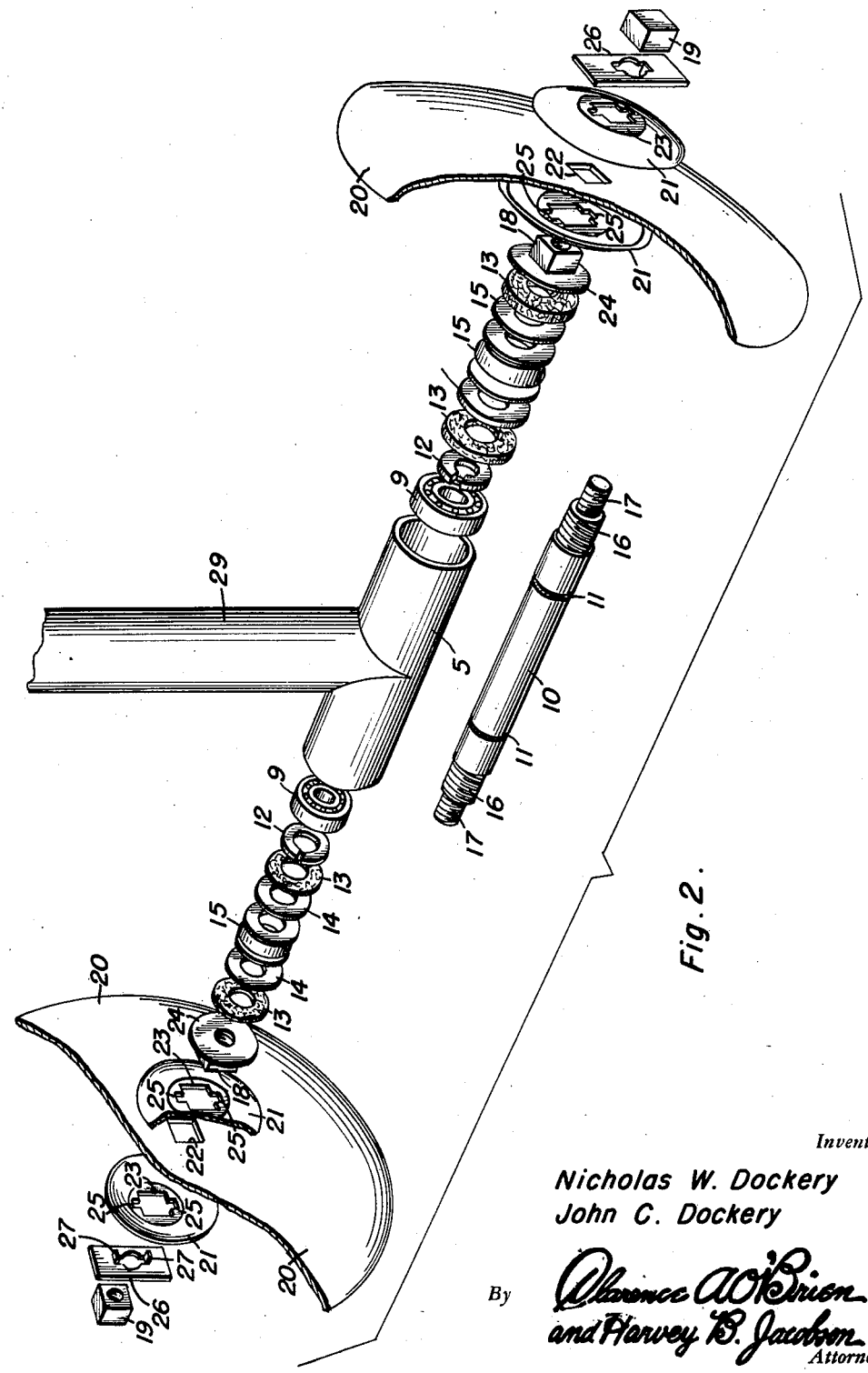

Patented June 12, 1951

2,556,492

UNITED STATES PATENT OFFICE 2,556,492

DISK UNIT FOR TILLING IMPLEMENTS

Nicholas W. Dockery and John C. Dockery,
Rockingham, N. C.

Application June 24, 1949, Serial No. 101,132

3 Claims. (Cl. 97—220)

This invention relates to disk units for harrows, cultivators and like tilling implements, and has particular reference to an improved disk unit of the type adapted to be turned about a vertical axis to angle the disks thereof relative to the direction of travel of the implement.

An object of the invention is to provide efficient means for removably securing disks on the ends of a shaft or axle which forms part of the unit.

Another object is to provide a unit of the above kind in which disks are secured on the ends of a shaft or axle, which axle is journaled in a tubular housing by means of anti-friction bearings, and in which efficient means is provided for securing the bearings in place and for preventing escape of grease from the housing and bearings.

The invention resides in certain features and construction hereinafter more fully described, shown in the accompanying drawings, and claimed.

In the drawings:

Figure 2 is an exploded view thereof;

Figure 1:
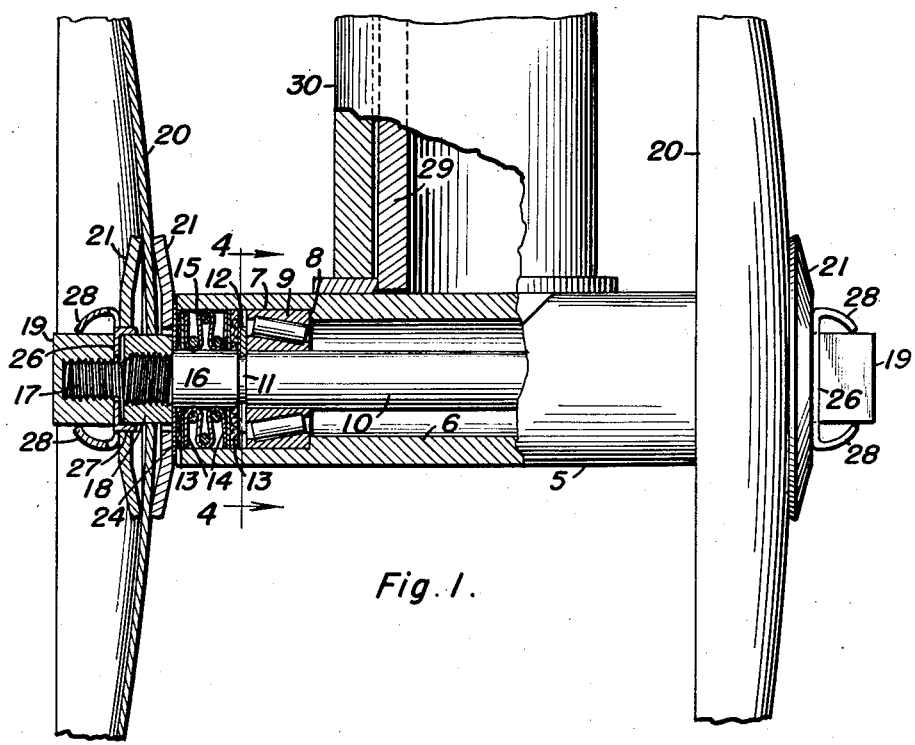
Figure 1 is a fragmentary view, partly in elevation and partly in section, of a disk unit embodying the present invention.
Figure 3:
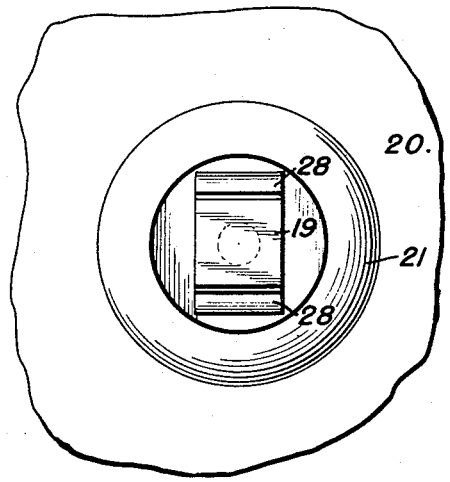
Figure 3 is a side view of the same.
Figure 4:
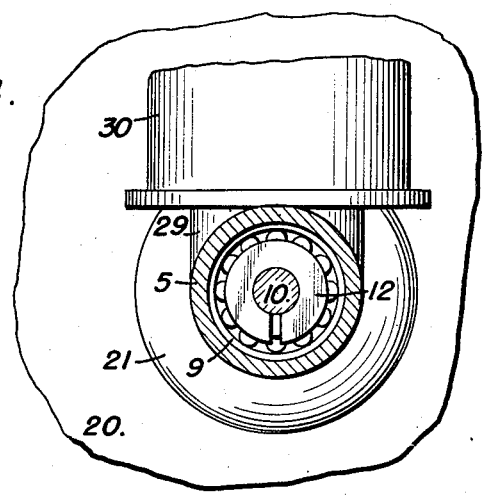
Figure 4 is a section taken on the line 4—4 of Figure 1.

Referring in detail to the drawings, 5 indicates a horizontal cylindrical shaft housing which has its bores 6 enlarged at each end as at 7 to provide an internal annular shoulder 8. Snugly fitted within the inner part of the enlarged bore portion 7 and butted against the shoulder 8 is the outer race of an anti-friction bearing 9. A shaft or axle 10 extends through and projects beyond the ends of the housing 5 and is supported axially of the latter by the bearings, the inner race of each bearing 9 being tightly fitted on said shaft or axle. At the outer side of each bearing 9, the shaft or axle 10 is provided with a circumferential groove 11 into which is snapped a split resilient retaining ring 12 which engages the outer side of the inner race of the adjacent bearing 9 to removably secure the latter in place against the associated shoulder 8. Within the outer part of the bore portion 7 are spaced felt washers 13 and metal washers 14 between which is disposed a conventional grease seal 15. Each projecting end portion of the shaft or axle 10 has a threaded inner part 16 and a reduced and threaded outer part 17, respectively having nuts 18 and 19 screwed thereon. The earth working disk 20 and a pair of dished resilient circular plates 21 are placed on the inner nut 18, the plates 21 being disposed at opposite sides of the disk 20 with their concave faces opposed, and the disk 20 and plates 21 respectively having polygonal central openings 22 and 23 which fit the nut 18 to provide a driving connection between the shaft or axle 10 and said disk and plates. The nut 18 has a flange 24 which contacts the outer felt washer 13, and the plates 21 have notches 25 at opposite sides of their openings 23. A lock washer 26 is disposed on the reduced and threaded outer part 17 of the shaft or axle between the nuts 18 and 19 and this lock washer contacts the outer plate 21 so that when the nut 19 is tightened, the plates 21 and disk 20 are compacted to place the plates 21 under tension and cause them to tightly grip the disk 20. Lock washer 26 has lugs 27 which enter the notches 25 of the outer plate 21 to hold said washer against turning relative to nut 18, disk 20 and plates 21, and the ends 28 of said lock washer are bent outwardly and downwardly against opposite sides of nut 19 to prevent unscrewing of the latter after it is tightened. The plates 21 are made the same so that either may be used at the outer side of disk 20 for coacting with lock washer 26. In this way, the parts are effectively held in assembled relation, and grease placed in the housing to lubricate the bearings 9 will be effectively prevented from escaping from said housing. Upon bending the ends 28 of the lock washer away from nut 19, the parts may be disassembled, and it will be obvious that such parts may be assembled at either end of the shaft or axle minus the disk 20 when only one disk is desired.

The housing 5 is welded or otherwise rigidly attached intermediate its ends to the lower end of a pivot post 29 adapted to be rotatably disposed in a depending bearing column 30 fixed to the frame of the tilling implement, whereby the unit may be turned about a vertical axis to angle the disks relative to the direction of travel of the implement.

From the foregoing description, it will be seen that the disk unit is simple in construction and otherwise adapted to meet the requirements for successful commercial use. Minor structural changes are contemplated within the spirit of the invention as claimed.

What is claimed as new is:

1. In a disk unit for tilling implements, in combination, a non-rotatable horizontal tubular shaft housing having an enlarged bore portion at each end defining an internal annular shoulder, an anti-friction bearing fitted in the inner part of each of said bore portions with its outer race abutting said shoulder, a shaft extending through and projecting beyond the ends of said housing and tightly fitted in the inner races of said bearings so as to be supported by said bearings axially of said housing for free rotation relative to the latter, said shaft having a circumferential groove directly at the outer side of each bearing, a split retaining ring engaged in each groove and engaging the outer side of the inner race of the adjacent bearing to hold the latter in place with its outer race against said shoulder, a grease seal within the outer part of each enlarged bore portion of the housing and at the outer side of the adjacent retaining ring, and means on each end of the shaft to hold the adjacent grease seal in place and to removably secure an earth-working disk on said end of the shaft in driving connection with the latter.

2. In a disk unit for tilling implements, in combination, a horizontal tubular shaft housing having an enlarged bore portion at each end defining an internal annular shoulder, an anti-friction bearing fitted in the inner part of each of said bore portions with its outer race abutting said shoulder, a shaft extending through and projecting beyond the ends of said housing and tightly fitted in the inner races of said bearings so as to be rotatably supported axially of said housing, said shaft having a circumferential groove at the outer side of each bearing, a split retaining ring engaged in each groove and engaging the outer side of the inner race of the adjacent bearing to hold the latter in place with its outer race against said shoulder, a grease seal within the outer part of each enlarged bore portion of the housing, each end of the shaft having an inner threaded part and an outer reduced and threaded part, a flanged nut screwed on said inner threaded part, dished resilient plates fitted on said nut, an earth-working disk fitted on said nut between said plates, a jamb nut screwed on said outer reduced and threaded part and holding the plates under tension in gripping engagement with said disk, and a lock washer for said jamb nut disposed on said reduced and threaded part between said nuts.

3. In a disk unit for tilling implements, in combination, a horizontal tubular shaft housing having an enlarged bore portion at each end defining an internal annular shoulder, an anti-friction bearing fitted in the inner part of each of said bore portions with its outer race abutting said shoulder, a shaft extending through and projecting beyond the ends of said housing and tightly fitted in the inner races of said bearings so as to be rotatably supported axially of said housing, said shaft having a circumferential groove at the outer side of each bearing, a split retaining ring engaged in each groove and engaging the outer side of the inner race of the adjacent bearing to hold the latter in place with its outer race against said shoulder, a grease seal within the outer part of each enlarged bore portion of the housing, each end of the shaft having an inner threaded part and an outer reduced and threaded part, a flanged nut screwed on said inner threaded part, dished resilient plates fitted on said nut, an earth-working disk fitted on said nut between said plates, a jamb nut screwed on said outer reduced and threaded part and holding the plates under tension in gripping engagement with said disk, and a lock washer for said jamb nut disposed on said reduced and threaded part between said nuts, said lock washer being interlocked with the outer resilient plate and engaged with opposite sides of said jamb nut.

NICHOLAS W. DOCKERY.
JOHN C. DOCKERY.

REFERENCES CITED

The following references are of record in the file of this patent:

UNITED STATES PATENTS

| Number | Name | Date |
| --- | --- | --- |
| 2,097,244 | Sjogren et al. | Oct. 26, 1937 |
| 2,102,822 | Viau | Dec. 21, 1937 |